(12) United States Patent
Huang et al.

(10) Patent No.: US 10,219,289 B2
(45) Date of Patent: Feb. 26, 2019

(54) NETWORK NODE, A BASE STATION FOR UPLINK GRANT PRE-ALLOCATION

(71) Applicant: Telefonaktiebolaget LM Ericsson (publ), Stockholm (SE)

(72) Inventors: Vincent Huang, Sollentuna (SE); Ying Sun, Sundbyberg (SE); Lotta Voigt, Bromma (SE); Eric Andersson, Järfälla (SE); Mona Matti, Nacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 125 days.

(21) Appl. No.: 15/026,487

(22) PCT Filed: Oct. 1, 2013

(86) PCT No.: PCT/SE2013/051137
§ 371 (c)(1),
(2) Date: Mar. 31, 2016

(87) PCT Pub. No.: WO2015/050480
PCT Pub. Date: Apr. 9, 2015

(65) Prior Publication Data
US 2016/0227562 A1 Aug. 4, 2016

(51) Int. Cl.
*H04W 72/12* (2009.01)
*H04W 72/14* (2009.01)
(Continued)

(52) U.S. Cl.
CPC .. *H04W 72/1252* (2013.01); *G06F 17/30902* (2013.01); *H04L 1/00* (2013.01);
(Continued)

(58) Field of Classification Search
None
See application file for complete search history.

(56) References Cited

U.S. PATENT DOCUMENTS 6,778,509 B1   8/2004  Ravishankar et al.
7,626,972 B2 * 12/2009  Garani ................... H04L 29/06
                                                  370/329

(Continued)

FOREIGN PATENT DOCUMENTS

WO   WO 2006/126920 A1   11/2006

OTHER PUBLICATIONS

Communication with Supplementary European Search Report, EPO Application No. 13895069.6, dated Sep. 8, 2016.

(Continued)

*Primary Examiner* — Saba Tsegaye
(74) *Attorney, Agent, or Firm* — Sage Patent Group

(57) ABSTRACT

A method in a network node downloads an upcoming web page to a user equipment. The network node obtains a first value, relating to the upcoming web page, of a set of features. The features represent any one out of: the upcoming web page, the user equipment, and a web browser in the user equipment. The network node predicts whether it is beneficial regarding download time to activate an uplink grant pre-allocation for the user equipment for downloading the upcoming web page. The prediction is based on a relationship between the first value and of a second value of the set of features, which second value is related to a previously downloaded web page, and an evaluation whether it is beneficial regarding download time to activate the uplink grant pre-allocation for the previously downloaded web page. The network node provides the prediction to a base station.

18 Claims, 7 Drawing Sheets

(51) Int. Cl.
  *H04L 29/08* (2006.01)
  *H04W 72/04* (2009.01)
  *H04L 1/00* (2006.01)
  *G06F 17/30* (2006.01)
  *H04W 28/26* (2009.01)

(52) U.S. Cl.
  CPC .............. *H04L 67/02* (2013.01); *H04L 67/22* (2013.01); *H04L 67/2847* (2013.01); *H04W 72/04* (2013.01); *H04W 72/14* (2013.01); *H04W 28/26* (2013.01); *H04W 72/1284* (2013.01)

(56) References Cited

U.S. PATENT DOCUMENTS

| | | | | |
|---|---|---|---|---|
| 7,769,863 | B2* | 8/2010 | Eidenschink | H04L 41/0896 709/224 |
| 8,780,823 | B1* | 7/2014 | Sebastian | H04W 4/18 370/248 |
| 2007/0026881 | A1* | 2/2007 | Tzavidas | H04W 72/1289 455/517 |
| 2012/0147840 | A1 | 6/2012 | Chen | |

OTHER PUBLICATIONS

Zatwarnicki, "Adaptive Scheduling System Guaranteeing Web Page Response Times", ICCCI 2012, Part II, LNAI 7654, Nov. 28, 2012 pp. 273-282 (XP047007666).

International Search Report, Application No. PCT/SE2013/051137, dated May 28, 2014.

Written Opinion of the International Searching Authority, Application No. PCT/SE2013/051137, dated May 28, 2014.

Ameigeiras et al., "QoE oriented cross-layer design of a resource allocation algorithm in beyond 3G systems", *Computer Communications,* vol. 33, Issue 5, Mar. 2010, pp. 571-582.

Chen et al., "Web Acceleration in Asymmetrical Mobile Network", *Wireless Personal Communications,* vol. 58, Issue 2, May 2011, pp. 281-313.

Han et al., "On Accelerating Content Delivery in Mobile Networks", *IEEE Communications Surveys & Tutorials,* vol. 15, No. 3, Third Quarter Jul. 2013, pp. 1314-1333.

IPWireless, "Radio Allocation and IP Aware Scheduling Strategies", Agenda Item: 11.9, Document for: Discussion, RAN2#56, Tdoc R2-063164, Riga, Latvia, Nov. 6-10, 2006, 6 pp.

* cited by examiner

NETWORK NODE, A BASE STATION FOR UPLINK GRANT PRE-ALLOCATION

CROSS REFERENCE TO RELATED APPLICATION

This application is a 35 U.S.C. § 371 national stage application of PCT International Application No. PCT/SE2013/051137, filed on Oct. 1, 2013, the disclosure and content of which is incorporated by reference herein in its entirety. The above-referenced PCT International Application was published in the English language as International Publication No. WO 2015/050480 A1 on Apr. 9, 2015.

TECHNICAL FIELD

Embodiments herein relate to a network node, a base station and methods therein. In particular, it relates to downloading a web page from a web server.

BACKGROUND

User Equipments (UE) are enabled to communicate wirelessly in a radio communications system, sometimes also referred to as a radio communications network, a mobile communication system, a wireless communications network, a wireless communication system, a cellular radio system or a cellular system. The communication may be performed via a radio channel, e.g. between a UE and a web server via a Radio Access Network (RAN) and possibly one or more core networks, comprised within the wireless communications network.

A cellular radio system covers a geographical area which is divided into cell areas, wherein each cell area is served by a network node such as a base station. In 3rd Generation Partnership Project (3GPP) Long Term Evolution (LTE), base stations may be referred to as eNodeBs or eNBs. The base stations communicate over the air interface operating on radio frequencies with the user equipments within range of the base stations.

3GPP LTE radio access standard has been written in order to support high bitrates and low latency both for uplink and downlink traffic. All data transmission in LTE is controlled by the radio base station.

In the context of this disclosure the expression downlink will be used for the transmission path from the base station to the user equipment. The expression uplink will be used for the transmission path in the opposite direction i.e. from the user equipment to the base station.

A primary function of a web server is to cater web pages according to requests of user equipments using a Hypertext Transfer Protocol (HTTP). This means delivery of HyperText Markup Language (HTML) documents and any additional content that may be included by a document, such as images, style sheets and scripts.

Web page browsing contributes to a large portion of the data traffic in mobile networks. However, it may provide unsatisfactory user experience due to a slow download time of a web page.

An uplink grant pre-allocation reserves resources for a user equipment before a Scheduling Request (SR) is sent, thus it enables uplink packets to be sent sooner. It reduces the acknowledge time of the Transmission Control Protocol (TCP). With a shorter round trip time, it is possible to reduce the total download time of the web page. However, since the uplink grant pre-allocation reserves resources, the total system capacity is reduced.

SUMMARY

An object of embodiments herein is to provide a way of improving the system capacity of a wireless communication network.

According to a first aspect of embodiments herein, the object is achieved by a method in a network node for assisting a base station in downloading an upcoming web page. The network node operates in a wireless communications network and the upcoming web page is to be downloaded to a user equipment.

The network node obtains a first value of a set of features. The first value relates to the upcoming web page. The set of features represent any one out of: the upcoming web page, the user equipment and a web browser in the user equipment.

The network node further predicts whether or not it is beneficial regarding download time to activate an uplink grant pre-allocation for the user equipment for downloading the upcoming web page. The prediction is based on a relationship between the first value of said set of features and of a second value of said set of features, which second value is related to a previously downloaded web page, and an evaluation whether or not it is beneficial regarding download time to activate the uplink grant pre-allocation for the previously downloaded web page.

The network node further provides to the base station the result of said predicting whether or not it is beneficial regarding download time to activate the uplink grant pre-allocation for the user equipment for downloading the upcoming web page.

According to a second aspect of embodiments herein, the object is achieved by a network node for assisting a base station in downloading an upcoming web page. The network node is configured to operate in a wireless communications network and the upcoming web page is to be downloaded to a user equipment.

The network node comprises an obtaining circuit configured to obtain a first value of a set of features. The first value relates to the upcoming web page. The set of features represent any one out of: the upcoming web page, the user equipment and a web browser in the user equipment.

The network node further comprises a predicting circuit configured to predict whether or not it is beneficial regarding download time to activate an uplink grant pre-allocation for the user equipment for downloading the upcoming web page based on:
a relationship between the first value of said set of features and of a second value of said set of features, which second value is related to a previously downloaded web page, and
an evaluation whether or not it is beneficial regarding download time to activate the uplink grant pre-allocation for the previously downloaded web page.

The network node further comprises a providing circuit configured to provide to the base station the result of said predicting whether or not it is beneficial regarding download time to activate the uplink grant pre-allocation for the user equipment for downloading the upcoming web page.

According to a third aspect of embodiments herein, the object is achieved by a method in a base station for downloading an upcoming web page. The base station operates in a wireless communications network and the upcoming web page is to be downloaded to a user equipment.

The base station obtains from a network node a result of a prediction whether or not it is beneficial regarding download time to activate an uplink grant pre-allocation for the user equipment for downloading the upcoming web page.

The base station further decides whether or not to activate the uplink grant pre-allocation for the user equipment for downloading the upcoming web page, based at least in part on the obtained result of the prediction.

According to a fourth aspect of embodiments herein, the object is achieved by a base station for downloading an upcoming web page, which base station is configured to operate in a wireless communications network and which upcoming web page is to be downloaded to a user equipment.

The base station comprises an obtaining circuit configured to obtain from a network node a result of a prediction whether or not it is beneficial regarding download time to activate an uplink grant pre-allocation for the user equipment for downloading the upcoming web page.

The base station further comprises a deciding circuit configured to decide whether to activate the uplink grant pre-allocation for the user equipment for downloading the upcoming web page or not, based at least in part on the obtained result of the prediction.

Since the network node assists the base station in downloading the upcoming web page by providing the result of said predicting, the wireless communications network only needs to reserve resources for the uplink grant pre-allocation for the web pages that may benefit from the uplink grant pre-allocation regarding download time. Thus the download time of web pages may be shortened without reducing the total system capacity more than necessary.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed below.

As mentioned above, web page browsing contributes to a large portion of the data traffic in wireless communications network. However, it may provide unsatisfactory user experience due to a slow download time of a web page.

The base station may reserve resources for the user equipment before the SR is sent, by activating an uplink grant pre-allocation. The activation of the uplink grant pre-allocation enables uplink packets to be sent sooner. It reduces the acknowledge time of the Transmission Control Protocol (TCP). With a shorter round trip time, it is possible to reduce the total download time of the web page. However, since the uplink grant pre-allocation reserves resources, the total system capacity is reduced when activating the uplink grant pre-allocation. The total download time is not reduced for all web pages when activating the uplink grant pre-allocation. Therefore, the total system capacity may be unnecessarily reduced for web pages that do not benefit from the uplink grant pre-allocation. This may be a problem in a wireless communications network since the system capacity may be reduced unnecessarily.

To improve the system capacity according to embodiments herein uplink grant pre-allocation is activated only for those web pages that may benefit from it.

The slow download time of the web page may be caused by many factors such as long latency and long execution time of code in the user equipments. Features of the web page, e.g. if it uses Java script or not, the user equipment, such as user equipment version, the web browser, e.g. the web browser version, may also contribute to the download time of the web page. Therefore, it is described herein how to activate uplink grant pre-allocation only for a combination of web pages, user equipment models and web browsers that may benefit from uplink grant pre-allocation according to embodiments herein.

Embodiments herein are defined as a network node, a base station and methods therein which may be put into practice in the embodiments described below. Further, terminologies from 3GPP LTE are used below only to facilitate explanation and example application. Other wireless systems using uplink packet grants may also benefit from the technology described herein.

Figure 1A:
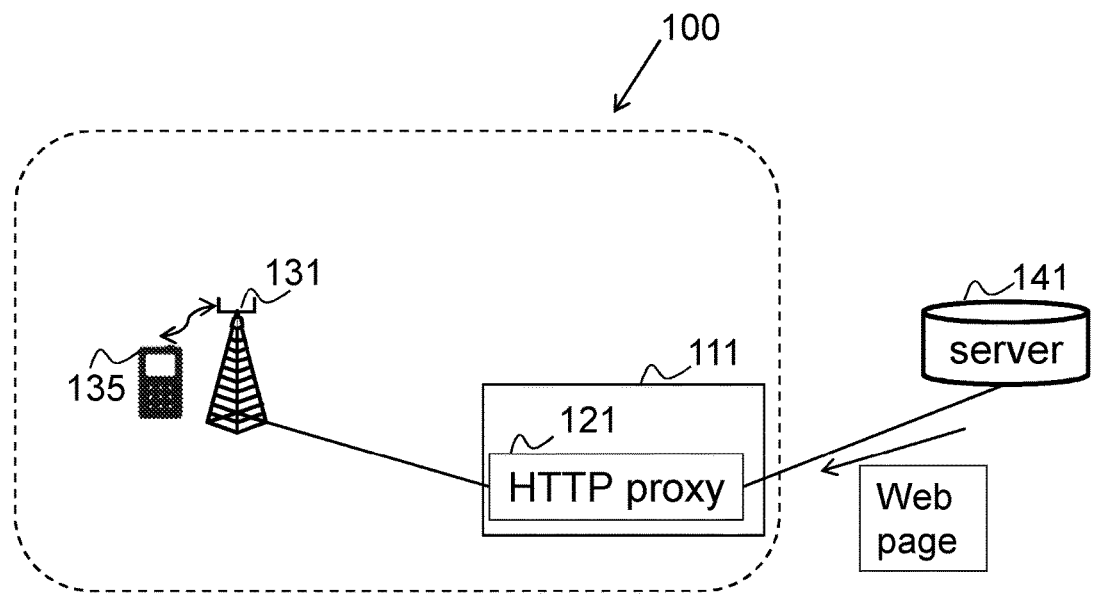
FIG. 1a-1c are schematic block diagrams illustrating embodiments of a wireless communications network and a web server.
Figure 1B:
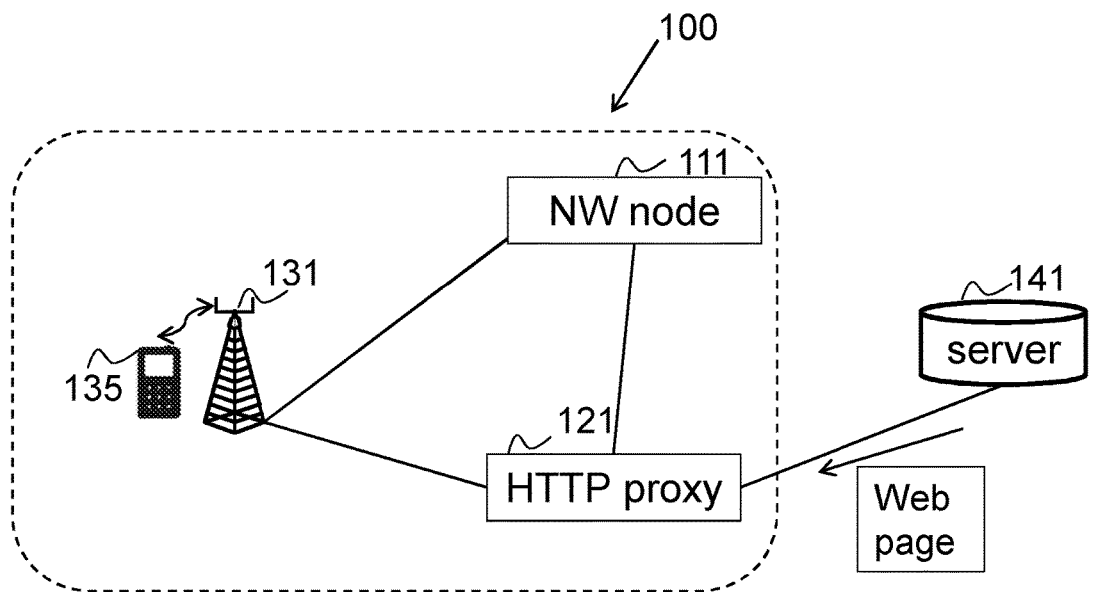
Figure 1C:
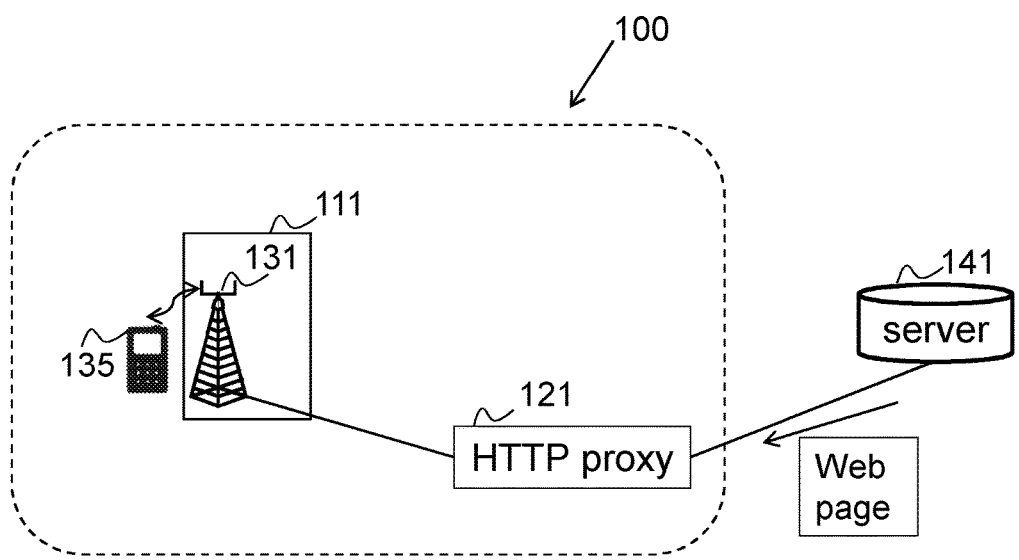

To improve the possibility to reduce the download time of web pages embodiments herein provide a method for assisting a base station in downloading an upcoming web page. FIG. 1a-1c depict a wireless communications network 100 in which embodiments herein may be implemented. The wireless communications network 100 may be for example a 3GPP LTE network.

The wireless communications network 100 comprises network nodes such as a network node 111. The network node 111 may for example be a core network node or a radio access node. More specifically the network node 111 may comprise a proxy such as an HTTP proxy 121, as seen in FIG. 1a. The HTTP proxy 121 may for example be a multiservice proxy. In some embodiments the network node 111 is separate from the HTTP proxy 121 but co-located with the HTTP proxy 121. The network node 111 may be separate from the HTTP proxy 121 which is shown in FIG. 1b. The HTTP proxy 121 may also be located outside the wireless communications network 100.

The wireless communications network 100 further comprises a base station 131. The base station 131, may be e.g. an "eNodeB" or "eNB".

In some embodiments the network node 111 is a base station such as the base station 131, which is shown in FIG. 1c.

The wireless communications network 100 further comprises user equipments such as a user equipment 135. The user equipment 135 may be for example a communication device such as a mobile telephone, a cellular telephone, a laptop or a tablet computer, sometimes referred to as a surf plate, with wireless capability. The user equipment 135 may be portable, pocket-storable, hand-held, computer-comprised, or a vehicle-mounted mobile device. The user equipment 135 uses a web browser to browse web pages.

The user equipment 135 communicates with the base station 131 via radio communication. The base station 131 communicates with the network node 111, e.g. via landlines, optical fiber, microwave, etc. The base station 131 has access to a web server 141, e.g. via the network node 111 or the HTTP proxy 121. In some embodiments the web server 141 is not part of the wireless communications network 100. The communication between the base station 131, the HTTP proxy 121 and the web server 141 may for example be performed via landlines. The network node 111 may communicate with the HTTP proxy 121, e.g. by landlines.

According to embodiments herein, the base station 111 should only activate uplink grant pre-allocation for a combination of web pages, user equipment models and web browsers that may benefit from the uplink grant pre-allocation. Such a combination may be represented by a set of features describing the content of the web page, the user equipment and the web browser. A set of features may comprise multiple features. Each feature may be embodied by a value, e.g. yes and no or 1 and 0. A specific web page may be represented by a value of the set of features. The value may comprise a multiple of values, for example one for each feature.

In an example scenario the network node 111 assists the base station 131 in downloading the upcoming web page to the user equipment 135 by providing to the base station 131 a prediction whether or not it is beneficial regarding download time to activate the uplink grant pre-allocation for downloading the upcoming web page.

In order to be able to provide the prediction, the network node 111 first obtains relationships between the content of earlier downloaded web pages, referred to as training web pages, and a respective desired decision whether it is beneficial to activate uplink grant pre-allocation for the training web pages. The content of the training web pages may be described by said set of features, which may also comprise the features of the user equipment and the web browsers to which the training web pages were downloaded.

The desired decision may for example be obtained by downloading the training web page twice, with and without uplink grant pre-allocation activated, and analyzing a function of the download times.

Then network node 111 then uses the obtained relationships to relate the content of the upcoming web page to a predicted result of whether or not it is beneficial regarding download time to activate an uplink grant pre-allocation for downloading the upcoming web page.

The base station 131 may combine the result of the provided prediction with other information such as cell load and radio condition to make a final decision of whether to activate the uplink grant pre-allocation.

In this way resources in the wireless communications network 100 are only reserved for downloading web pages that are predicted to benefit from the activation of the uplink grant pre-allocation. Thereby the total download time of upcoming web pages may be shortened without reducing the total capacity of the wireless communications network 100 more than necessary.

A further advantage of embodiments herein is that the prediction may be based on actual download times of web pages in a running network and on machine learning.

Figure 2:
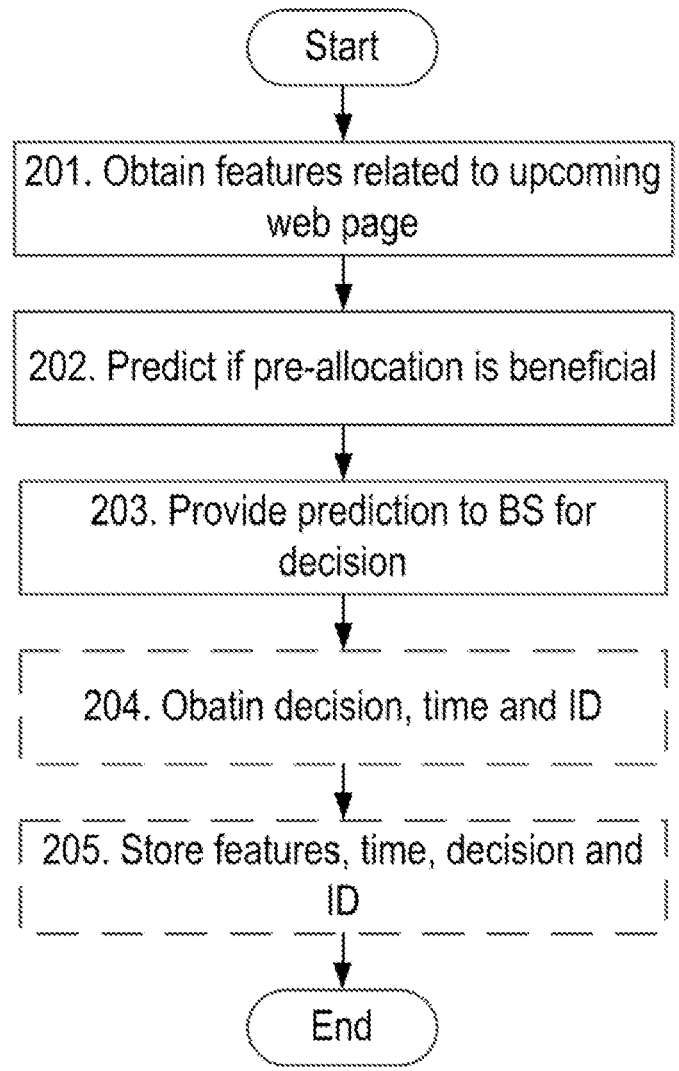
FIG. 2 is a flowchart depicting embodiments of a method in a network node.

Embodiments of a method in a network node 111, 112 for assisting the base station 131 in downloading the upcoming web page will now be described with reference to to a flowchart depicted in FIG. 2.

As mentioned above the wireless communications network 100 comprises the network node 111, e.g. the network node 111 comprising the HTTP proxy 121, the user equipment 135, and the base station 131.

The method comprises the following actions, which actions may be taken in any suitable order. Dashed lines of some boxes in FIG. 2 indicate that this action is not mandatory. Further, actions may be combined.

As an example scenario the user equipment 135 is browsing the upcoming web page and has sent a request for the upcoming web page, e.g. a HTTP request, to the web server 141. The web server 141 has sent the upcoming web page for the user equipment 135, to the HTTP proxy 121.

Action 201

In order for the network node 111 to assist the base station 131 in downloading the upcoming web page, the network node 111 first obtains a first value of a set of features, which first value relates to the upcoming web page. The set of features represent any one out of: the upcoming web page, the user equipment 135 and a web browser in the user equipment 135. The first value will be used to predict whether or not it is beneficial to activate uplink grant pre-allocation regarding download time in a further action described below.

The upcoming web page may contain java scripts or various linked elements, i.e. elements that are linked to other elements, e.g. on other web pages. As mentioned above, each web page may be described by several features, such as browser version of the user equipment, user equipment model, java script key words, type of linked elements, address to the linked elements, server of the upcoming web page, features of executable codes, web element types and links, etc.

The network node 111 may obtain the first value of said set of features from the HTTP proxy 121. The HTTP proxy 121 may extract the first value of said set of features from the web page.

Action 202

When the network node 111 has obtained the first value of the set of features, the network node 111 predicts whether or not it is beneficial regarding download time to activate the uplink grant pre-allocation for the user equipment 135 for downloading the upcoming web page. The predicting is based on a relationship between the first value of said set of features and of a second value of said set of features. The second value is related to a previously downloaded web page. The predicting is further based on an evaluation whether or not it is beneficial regarding download time to activate the uplink grant pre-allocation for the previously downloaded web page.

Naturally, the previously downloaded web page may comprise multiple previously downloaded web pages. In this case each previously downloaded web page may be related to a respective second value of said set of features. Correspondingly, there may be a respective evaluation for each previously downloaded web page.

The network node 111 may train itself or may be trained to obtain said relationship, which also may be referred to as a model. Said relationship between the first value and the second value may be obtained by for example machine learning.

Machine learning may comprise the construction and study of algorithms and systems that can learn from data. In general, machine learning algorithms process large amounts of data, discover patterns in data, and construct predictive models for a desired task. Any machine learning algorithm may be used to find the relationship or the model. For example, the machine learning may be based on a neural network, a random forest, a gradient boosting machine, decision tree learning, association rule learning, artificial neural networks, inductive logic programming, support vector machines, clustering, Bayesian networks, reinforcement learning, representation learning, similarity and metric learning or sparse Dictionary Learning.

In the training phase, i.e. before the predicting, the evaluation whether or not it is beneficial regarding download time to activate the uplink grant pre-allocation for the previously downloaded web page, may be provided to the network node 111. Said relationship or the model may then be applied to any upcoming web page to predict whether or not it is beneficial regarding download time to activate an uplink grant pre-allocation for the user equipment 135 for downloading the upcoming web page. For example, the network node 111 compares the first value of the set of features with the second value of the set of features and makes a prediction for the upcoming web page further based on the evaluation whether or not it is beneficial regarding download time to activate the uplink grant pre-allocation for the previously downloaded web page. A basic example will be given here. The upcoming web page contains linked elements. The value of the feature linked elements may be set to one in the case that the web page contains linked elements and zero if the web page does not contain any linked elements. Thus, the first value relating to the upcoming web page is set to one in this example. Further, one thousand of training web pages with the second value set to one have been previously downloaded with and without uplink grant pre-allocation activated and evaluated thereafter. For all of the training web pages the evaluation is that it is beneficial to activate the uplink grant pre-allocation. In this basic example the prediction may be that it is beneficial also for the upcoming web page to activate uplink grant pre-allocation, since there is a strong relationship between the first and the second value of one of the features.

Said evaluation whether or not it is beneficial regarding download time to activate uplink grant pre-allocation for the previously downloaded web page may be based on a difference between a first total time for downloading the previously downloaded web page without the uplink grant pre-allocation and a second total time for downloading the previously downloaded web page with the uplink grant pre-allocation.

The training of the network node 111 may be performed off-line. For example, a large number of previously downloaded web pages may be downloaded with and without pre-allocation. The total download time with and without pre-allocation enabled are then compared to evaluate whether to use pre-allocation or not for each previously downloaded web page.

The data for the training, that is the previously downloaded web pages, may be collected from a running network or from a specific test. When performing the specific test, the wireless communications network 100 may alternately enable and disable the pre-allocation feature when the same previously downloaded web page is downloaded. In this mode, the system does not do any predicting.

In some other embodiments the method utilizes data collected from a live network. For example, the download time for each previously downloaded web page may be recorded and stored together with the information of whether pre-allocation is enabled or not, as is done in the optional action 205.

In some embodiments a result of said evaluation is that it is beneficial to activate pre-allocation for the previously downloaded web page for which the difference between the first total time and the second total time for downloading the previously downloaded web page is greater than a threshold time difference.

Figure 3:
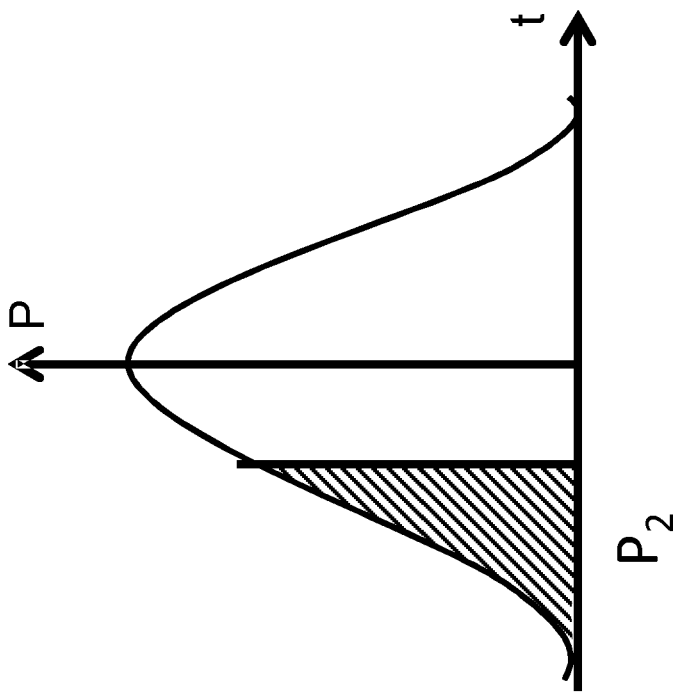
FIG. 3 is a schematic diagram illustrating details of an embodiment of a method in a network node.
Figure 3:
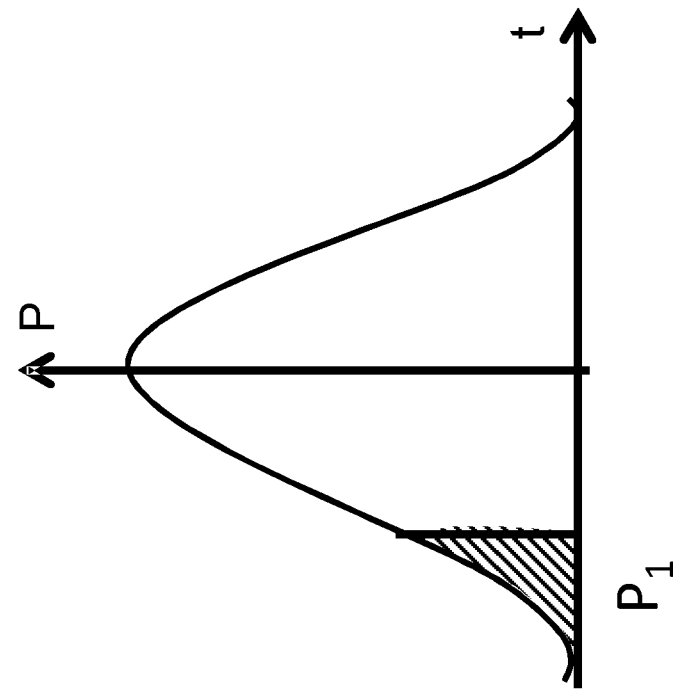

In some other embodiments the distribution of the total download time of all previously downloaded web pages may be calculated and normalized for with pre-allocation case and without pre-allocation case as seen in FIG. 3. The useful examples are the web pages that have appeared in both cases. Then the result of said evaluation may be that it is beneficial to activate pre-allocation for a respective previously downloaded web page for which the difference between a first percentage of the previously downloaded web pages, P1, and a second percentage of the previously downloaded web pages, P2, is greater than a threshold percentage difference. P1 is the percentage of the previously downloaded web pages with shorter normalized download times without pre-allocation than a normalized download time without pre-allocation of the respective previously downloaded web page, while P2 is the percentage of the previously downloaded web pages with shorter normalized download times with pre-allocation than a normalized download time with pre-allocation of the respective previously downloaded web page. With this approach, it is possible to adjust the evaluation and the predicting dynamically so that uplink grant pre-allocation is activated only for the upcoming web pages for which it is beneficial regarding download time.

Action 203

After the network node 111 has predicted whether or not it is beneficial regarding download time to activate the uplink grant pre-allocation for the user equipment 135 for downloading the upcoming web page the network node 111 provides to the base station 131 the result of said predicting.

As described further below in action 502 the base station 131 may combine the provided result of said predicting with other information such as cell load and radio condition to make a final decision of whether or not to activate the uplink grant pre-allocation for the user equipment 135.

Action 204

In order for the network node 111 to take advantage of the large number of web pages that may be downloaded in the running wireless communications network 100 the network node may obtain feedback from the base station regarding the final decision and the download time of a downloaded web page. The downloaded web page will be referred to as the upcoming web page below.

In some embodiments the network node 111 obtains the final decision from the base station 131 that uplink grant pre-allocation has been used or not for the user equipment 135 for downloading the upcoming web page and a download time of the upcoming web page. This decision may be used in the same way as the evaluations for the previously downloaded web pages in action 202.

Action 205

In order for the network node 111 to take advantage of the large number of web pages that may be downloaded the network node 111 may store the obtained final decision together with an identity of the upcoming web page, the first value of said set of features and a download time of the upcoming web page. By storing the obtained final decision together with the identity, the first value and the download time of the upcoming web page the network node 111 may use the stored information to update the relation between the set of features and the evaluations. In this way it is possible to adjust the evaluation and the predicting dynamically.

Figure 4:
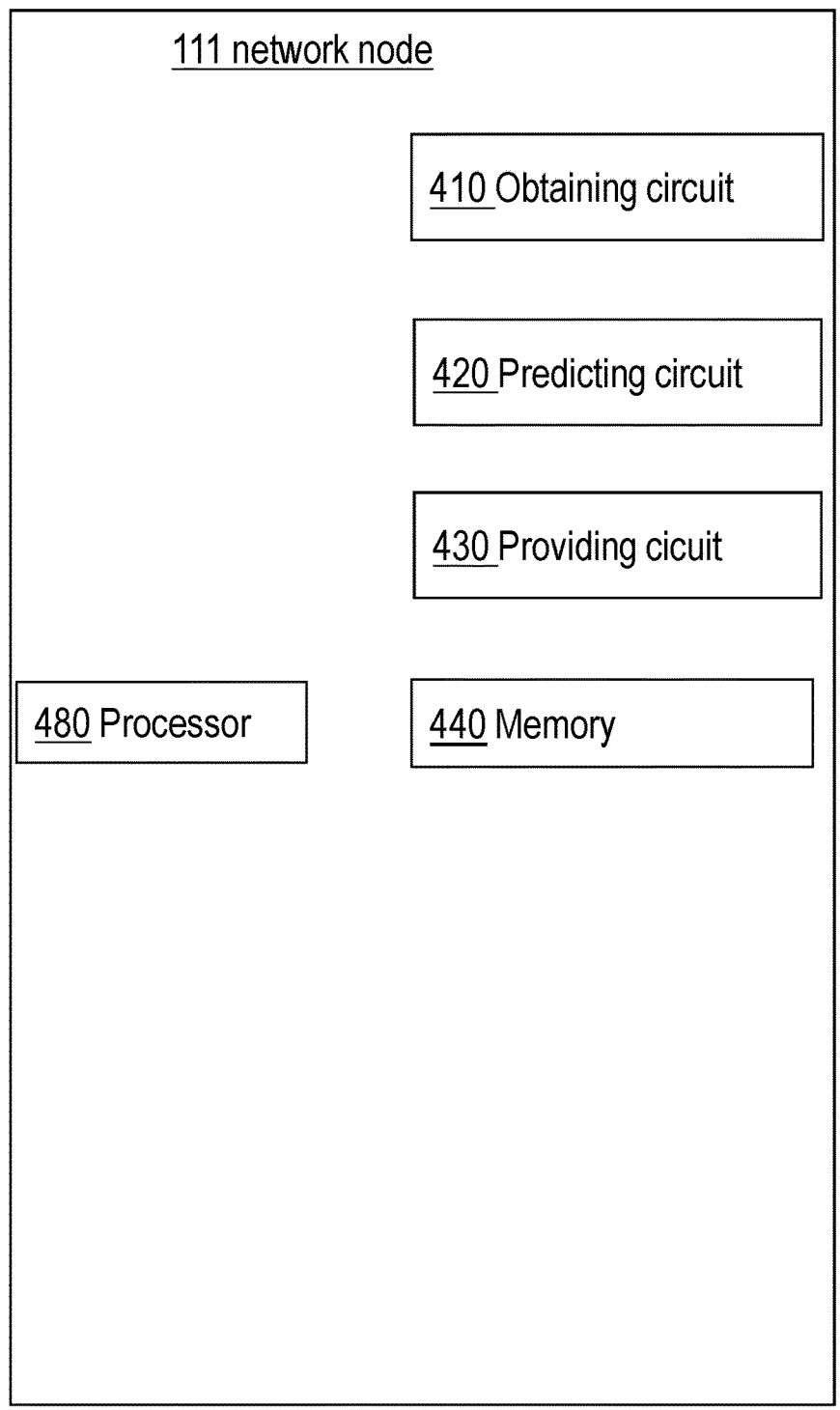
FIG. 4 is a schematic block diagram illustrating embodiments of a network node.

To perform the method actions for assisting the base station 131 in downloading an upcoming web page described above in relation to FIG. 2, the network node 111 comprises the following arrangement depicted in FIG. 4.

As mentioned above, the user equipment 135 is configured to operate in a wireless communications network 100. The upcoming web page is to be downloaded to the user equipment 135 from the web server 141 via the HTTP proxy 121. The network node 111 is further configured to communicate with the base station 131, e.g. by landlines. Further, the network node 111 may comprise the HTTP proxy 121.

The network node 111 comprises an obtaining circuit 410 configured to obtain the first value of the set of features. The first value relates to the upcoming web page. The set of features represent any one out of: the upcoming web page, the user equipment 135 and a web browser in the user equipment 135.

The obtaining circuit 410 may further be configured to obtain the first value of said set of features from a HTTP proxy 121.

In some embodiments the obtaining circuit 410 is configured to obtain the final decision from the base station 131 that uplink grant pre-allocation has been used or not for the user equipment 135 for downloading the upcoming web page. In these embodiments the obtaining circuit 410 is further configured to obtain the download time of the upcoming web page and an identity of the upcoming web page.

The network node 111 further comprises a predicting circuit 420 configured to predict whether or not it is beneficial regarding download time to activate the uplink grant pre-allocation for the user equipment 135 for downloading the upcoming web page. The predicting is based on a relationship between the first value of said set of features and of the second value of said set of features and the evaluation whether or not it is beneficial regarding download time to activate the uplink grant pre-allocation for the previously downloaded web page. The second value is related to the previously downloaded web page.

In some embodiments said evaluation whether or not it is beneficial regarding download time to activate the uplink grant pre-allocation for the previously downloaded web page is based on the difference between the first total time for downloading the previously downloaded web page without the uplink grant pre-allocation and the second total time for downloading the previously downloaded web page with the uplink grant pre-allocation.

The result of said evaluation may be that it is beneficial to activate pre-allocation for the previously downloaded web page for which the difference between the first total time and the second total time for downloading the previously downloaded web page is greater than the threshold time difference.

The previously downloaded web page may comprise multiple previously downloaded web pages. In this case each previously downloaded web page may be related to a respective second value of said set of features. Correspondingly, there may be a respective evaluation for each previously downloaded web page. The result of said evaluation may be to activate pre-allocation for the respective previously downloaded web page for which the difference between the first percentage of the previously downloaded web pages, P1, and the second percentage of the previously downloaded web pages, P2, is greater than the threshold percentage difference. P1 is the percentage of the previously downloaded web pages with shorter normalized download times without pre-allocation than the normalized download time without pre-allocation of the respective previously downloaded web page. P2 is the percentage of the previously downloaded web pages with shorter normalized download times with pre-allocation than the normalized download time with pre-allocation of the respective previously downloaded web page.

The network node 111 may further comprise a providing circuit 430 configured to provide to the base station 131 the result of said predicting whether or not it is beneficial regarding download time to activate the uplink grant pre-allocation for the user equipment 135 for downloading the upcoming web page.

The network node 111 may further comprise a memory 440 comprising one or more memory units. The memory 440 may be configured to store the obtained decision together with the identity of the upcoming web page, the first value of said set of features, and the download time of the upcoming web page.

The memory 490 may further be configured to store information obtained from for example the base station 131 and/or the user equipment 135 and/or from the HTTP proxy 121 and/or from the web server 141. Such information may be information about obtained decisions, the identity of web pages, the values of set of features, the relation between the second value of the set of features and the evaluation whether or not it is beneficial regarding download time to activate the uplink grant pre-allocation for the previously downloaded web page, and the download time of web pages, etc. The memory 490 may also store configurations and applications to perform the methods herein when being executed in the network node 111.

The embodiments herein for assisting the base station 131 in downloading the upcoming web page may be implemented through one or more processors, such as a processor 480 in the network node 111 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the network node 111. One such carrier may be in the form of a flash memory. It is however feasible with other data carriers such as a read only memory, random access memory, etc. The computer program code may furthermore be provided as pure program code on a server and downloaded to the network node 111.

Those skilled in the art will also appreciate that the obtaining circuit 410, predicting circuit 420 and providing circuit 430 described above may refer to a combination of analog and digital circuits, and/or one or more processors configured with software and/or firmware, e.g. stored in the memory 440, that when executed by the one or more processors such as the processor 480 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Actions described above will be described below in more detail from a perspective of the base station 131.

Figure 5:
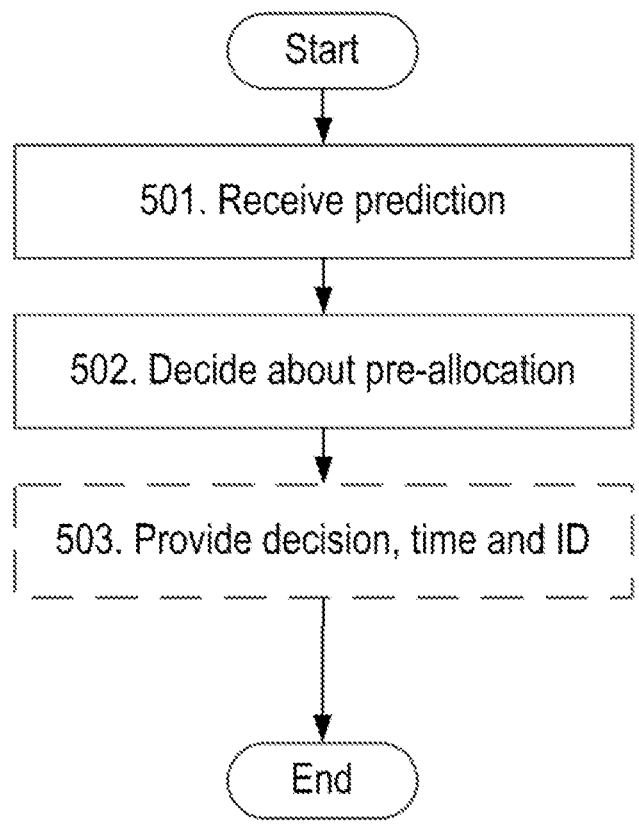
FIG. 5 is a flowchart depicting embodiments of a method in a base station.

Examples of embodiments of a method in the base station 131 for downloading an upcoming web page will now be described with reference to the flowchart depicted in FIG. 5. As mentioned above the wireless communications network 100 comprises the network node 111, e.g. the network node 111 comprising the HTTP proxy 121, the user equipment 135, and the base station 131. The user equipment 135 is browsing a web page and has sent a request, e.g. a HTTP request, to the web server 141 via the HTTP proxy 121. The user equipment 135 communicates with the HTTP proxy 121 via the base station 131. Further, the HTTP proxy 121 communicates with the web server 141. The web server 141 has sent the web page to the user equipment 135 via the HTTP proxy 121.

The method comprises the following actions, which actions may be taken in any suitable order. Dashed lines of some boxes in FIG. 5 indicate that this action is not mandatory.

Action 501

The base station 131 obtains from the network node 111 the result of the prediction whether or not it is beneficial regarding download time to activate the uplink grant pre-allocation for the user equipment 135 for downloading the upcoming web page.

Action 502

The base station 131 decides whether or not to activate the uplink grant pre-allocation for the user equipment 135 for downloading the upcoming web page, based at least in part on the result of the prediction obtained in action 501.

Action 503

The base station 131 provides to the network node 111 the decision whether or not the base station 131 has activated the uplink grant pre-allocation for the user equipment 135 for downloading the upcoming web page, a download time of the upcoming web page and an identity of the upcoming web page.

Figure 6:
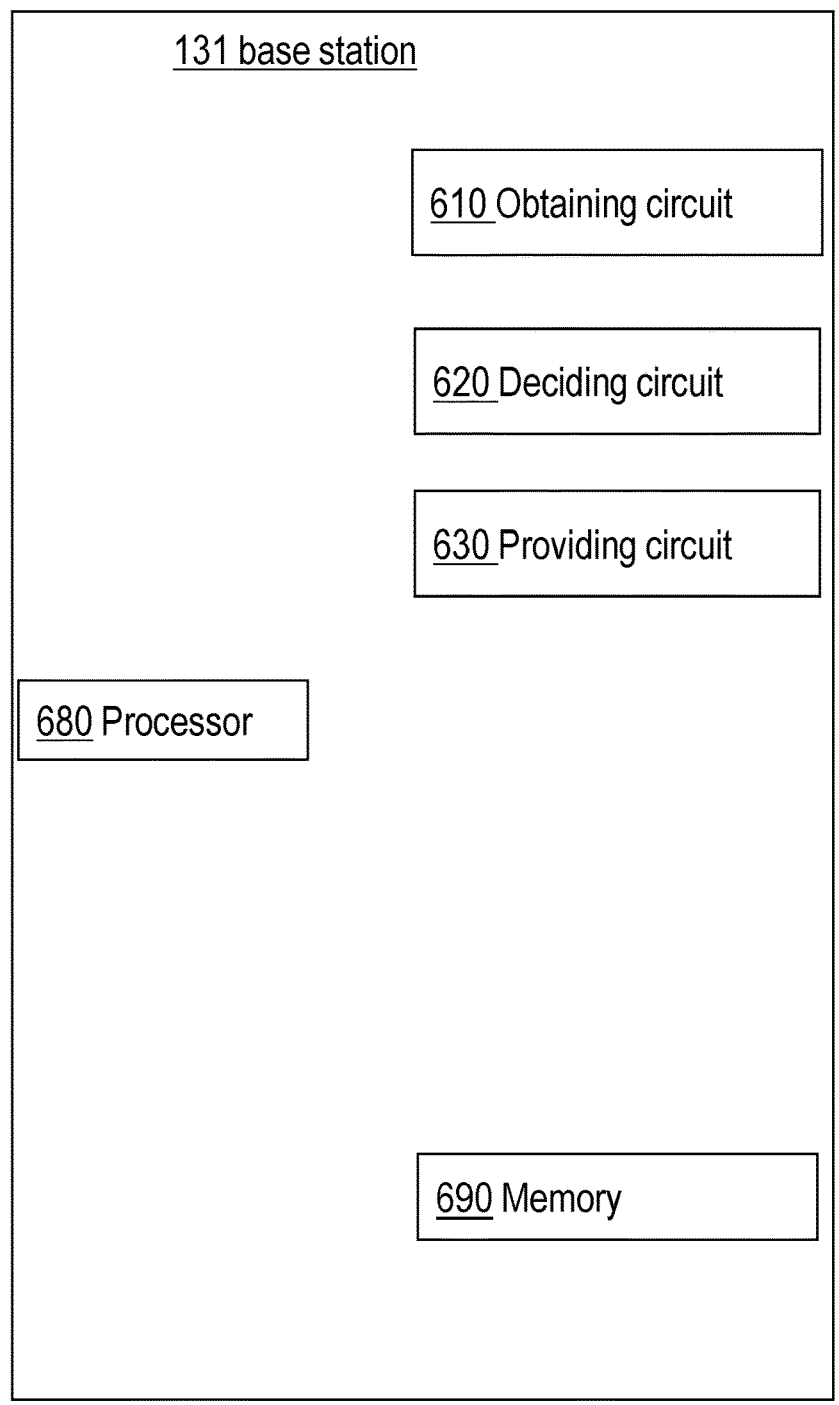
FIG. 6 is a schematic block diagram illustrating embodiments of a base station.

To perform the method actions for downloading the upcoming web page to the user equipment 135 described above in relation to FIG. 5, the base station 135 comprises the following arrangement depicted in FIG. 6.

As mentioned above, the base station 131 is configured to operate in a wireless communications network 100 and further configured to download the upcoming web page to the user equipment 135. The base station 131 is arranged to communicate with the user equipment 135, the web server 141 via the HTTP proxy 121 and the network node 111.

The base station 131 comprises an obtaining circuit 610 configured to obtain from the network node 111 a result of the prediction whether or not it is beneficial regarding download time to activate the uplink grant pre-allocation for the user equipment 135 for downloading the upcoming web page.

The base station 131 may further comprise a deciding circuit 620 configured to decide whether to activate the uplink grant pre-allocation for the user equipment 135 for downloading the upcoming web page or not, based at least in part on the obtained result of the prediction.

The base station 131 may further comprise a providing circuit 630 configured to provide to the network node 111 a decision whether or not the base station 131 has activated the uplink grant pre-allocation for the user equipment 135 for downloading the upcoming web page. The providing circuit 630 is further configured to provide to the network node 111 a download time of the upcoming web page and an identity of the upcoming web page.

The embodiments herein for downloading an upcoming web page may be implemented through one or more processors, such as a processor 680 in the base station 131 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the base station 131. One such carrier may be in the form of a CD ROM disc. It is however feasible with other data carriers such as a memory stick. The computer program code may furthermore be provided as pure program code on a server and downloaded to the third base station 131.

The base station 131 may further comprise a memory 690 comprising one or more memory units. The memory 690 is arranged to store information obtained from for example the network node 111 and/or the HTTP proxy 121 and/or the user equipment 135. Such information may be information about the prediction obtained from the network node 111, etc. The memory 690 may also store configurations and applications to perform the methods herein when being executed in the base station 131.

Those skilled in the art will also appreciate that the obtaining circuit 610, deciding circuit 620 and providing circuit 630 described above may refer to a combination of analog and digital circuits, and/or one or more processors configured with software and/or firmware, e.g. stored in a memory, that when executed by the one or more processors such as the processor 680 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a network node in communication with a base station and configured to assist the base station in activating an uplink grant pre-allocation for a user equipment served by the base station to download a requested web page to the user equipment, said network node, said base station, and said user equipment operate in a wireless communications network, the method comprising:

obtaining, by the network node, a first value of a set of features related to the requested web page, and which set of features represent any one out of: a content of the requested web page, the user equipment, and a web browser in the user equipment;

predicting, at the network node, whether or not it is beneficial to activate an uplink grant pre-allocation for the user equipment in the wireless communications network to download the requested web page based on:

a comparison between the first value of said set of features and of a second value of said set of features, said second value is related to a previously downloaded web page, and an evaluation whether or not it is beneficial to activate the uplink grant pre-allocation based on a time to download the previously downloaded web page in the wireless communications network; and providing, by the network node to the base station, the result of said predicting whether or not it is beneficial to activate the uplink grant pre-allocation for the user equipment to download the requested web page.

2. The method according to claim 1, wherein said evaluation whether or not it is beneficial to activate the uplink grant pre-allocation based on a time to download the previously downloaded web page is based on a difference between a first total time for downloading the previously downloaded web page without the uplink grant pre-allocation and a second total time for downloading the previously downloaded web page with the uplink grant pre-allocation.

3. The method according to claim 2, wherein a result of said evaluation is that it is beneficial to activate pre-allocation for the previously downloaded web page for which the difference between the first total time and the second total time for downloading the previously downloaded web page is greater than a threshold time difference.

4. The method according to claim 2, wherein the previously downloaded web page comprises multiple previously downloaded web pages, which each relates to a respective second value of said set of features, and a respective evaluation, and wherein the result of said respective evaluation is that it is beneficial to activate pre-allocation for a respective previously downloaded web page for which the difference between a first percentage of the previously downloaded web pages, P1, and a second percentage of the previously downloaded web pages, P2, is greater than a threshold percentage difference, wherein P1 is the percentage of the previously downloaded web pages with shorter normalized download times without pre-allocation than a normalized download time without pre-allocation of the respective previously downloaded web page, P2 is the percentage of the previously downloaded web pages with shorter normalized download times with pre-allocation than a normalized download time with pre-allocation of the respective previously downloaded web page.

5. The method according to claim 1, wherein the obtaining the first value of said set of features is performed by obtaining the first value of said set of features from an HTTP proxy.

6. The method according to claim 1, further comprising:
obtaining a decision from the base station that the uplink grant pre-allocation has been used or not for the user equipment to download the requested web page and a download time of the upcoming web page, and an identity of the requested web page, and
storing the obtained decision together with the identity of the requested web page, the first value of said set of features and the download time of the requested web page.

7. The method of claim 1, wherein the result of said predicting indicates it is beneficial to activate the uplink grant pre-allocation for the user equipment to download the requested web page.

8. The method of claim 1, further comprising obtaining the second value of the set of features related to the requested web page live from the wireless communication network.

9. A network node in communication with a base station and configured to assist the base station in activating an uplink grant pre-allocation for a user equipment served by the base station to download a requested web page to the user equipment, said network node, said base station, and said user equipment operate in a wireless communications network, the network node comprising:
a processor and a memory comprising instructions that when executed by said processor cause the processor to operate to:
obtain a first value of a set of features related to the requested web page, and which set of features represent any one out of: a content of the requested web page, the user equipment, and a web browser in the user equipment,
predict whether or not it is beneficial to activate an uplink grant pre-allocation in the wireless communications network for the user equipment to download the requested web page based on:
a comparison between the first value of said set of features and of a second value of said set of features, said second value is related to a previously downloaded web page, and
an evaluation whether or not it is beneficial to activate the uplink grant pre-allocation based on a time to download the previously downloaded web page in the wireless communications network, and
provide to the base station the result of said predicting whether or not it is beneficial to activate the uplink grant pre-allocation for the user equipment to download the requested web page.

10. The network node according to claim 9, wherein said evaluation whether or not it is beneficial to activate the uplink grant pre-allocation based on a time to download the previously downloaded web page is based on a difference between a first total time for downloading the previously downloaded web page without the uplink grant pre-allocation and a second total time for downloading the previously downloaded web page with the uplink grant pre-allocation.

11. The network node according to claim 10, wherein a result of said evaluation is that it is beneficial to activate pre-allocation for the previously downloaded web page for which the difference between the first total time and the second total time for downloading the previously downloaded web page is greater than a threshold time difference.

12. The network node according to claim 11, wherein the previously downloaded web page comprises multiple previously downloaded web pages, which each relates to a respective second value of said set of features, and a respective evaluation, and wherein the result of said respective evaluation is that it is beneficial to activate pre-allocation for a respective previously downloaded web page for which the difference between a first percentage of the previously downloaded web pages, P1, and a second percentage of the previously downloaded web pages, P2, is greater than a threshold percentage difference, wherein P1 is the percentage of the previously downloaded web pages with shorter normalized download times without pre-allocation than a normalized download time without pre-allocation of the respective previously downloaded web page, P2 is the percentage of the previously downloaded web pages with shorter normalized download times with pre-allocation than a normalized download time with pre-allocation of the respective previously downloaded web page.

13. The network node according to claim 10, wherein the processor further operates to obtain the first value of said set of features from a HTTP proxy.

14. The network node according to claim 10, wherein the processor further operates to obtain a decision from the base station that the uplink grant pre-allocation has been used or not for the user equipment to download the requested web page and a download time of the upcoming web page, and an identity of the requested web page, and wherein the network node further comprises a memory configured to store the obtained decision together with the identity of the requested web page, the first value of said set of features and the download time of the requested web page.

15. A method performed by a base station in communication with a network node configured to assist the base station in activating an uplink grant pre-allocation for a user equipment served by the base station to download a requested web page to the user equipment, said base station, said network node, and said user equipment operate in a wireless communications network, the method comprising:
obtaining, from the network node, a result of a prediction whether or not it is beneficial to activate an uplink grant pre-allocation in the wireless communications network for the user equipment to download the requested web page, determining whether or not to activate the uplink grant pre-allocation in the wireless communications network for the user equipment to download the requested web page, based at least in part on the obtained result of the prediction, and providing to the network node a decision whether or not the base station has activated the uplink grant pre-allocation for the user equipment to download the requested web page, a download time of the requested web page and an identity of the requested web page.

16. The method of claim 15, further comprising:

responsive to determining to activate the uplink grant pre-allocation in the wireless communications network for the user equipment to download the requested web page, activating the uplink grant pre-allocation in the wireless communications network for the user equipment.

17. A base station in communication with a network node configured to assist the base station in activating an uplink grant pre-allocation for a user equipment served by the base station to download a requested web page to the user equipment, said base station, said network node, and said user equipment operate in a wireless communications network, the base station comprising:

a processor and a memory comprising instructions that when executed by said processor cause the processor to operate to:

obtain from a network node a result of a prediction whether or not it is beneficial to activate an uplink grant pre-allocation in the wireless communications network for the user equipment to download the requested web page, determine whether or not to activate the uplink grant pre-allocation in the wireless communications network for the user equipment to download the requested web page, based at least in part on the obtained result of the prediction, and provide to the network node a decision whether or not the base station has activated the uplink grant pre-allocation for the user equipment to download the requested web page, a download time of the requested web page and an identity of the requested web page.

18. The base station of claim 17, wherein the processor further operates to:

activate the uplink grant pre-allocation in the wireless communications network for the user equipment in response to determining to activate the uplink grant pre-allocation in the wireless communications network for the user equipment to download the requested web page.

* * * * *